(12) United States Patent
Min et al.

(10) Patent No.: US 10,462,489 B2
(45) Date of Patent: Oct. 29, 2019

(54) IMAGE PROCESSING DEVICE AND PROCESSING METHOD THEREOF

(71) Applicant: ELECTRONICS AND TELECOMMUNICATIONS RESEARCH INSTITUTE, Daejeon (KR)

(72) Inventors: Gi Hyeon Min, Icheon-si (KR); Nack Woo Kim, Seoul (KR); Mun Seob Lee, Daejeon (KR); Byung-Tak Lee, Suwon-si (KR); Young Sun Kim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 346 days.

(21) Appl. No.: 15/335,558

(22) Filed: Oct. 27, 2016

(65) Prior Publication Data

US 2017/0238017 A1    Aug. 17, 2017

(30) Foreign Application Priority Data

Feb. 17, 2016  (KR) .................. 10-2016-0018296

(51) Int. Cl.
```
H04N 19/62      (2014.01)
H04N 19/36      (2014.01)
H04N 19/597     (2014.01)
G03H 1/00       (2006.01)
```
(52) U.S. Cl.
CPC .............. *H04N 19/62* (2014.11); *G03H 1/00* (2013.01); *H04N 19/36* (2014.11); *H04N 19/597* (2014.11)

(58) Field of Classification Search
CPC ...................................................... H04N 19/62
USPC ..................................................... 375/240.18
See application file for complete search history.

(56) References Cited

U.S. PATENT DOCUMENTS

| | | | |
|---|---|---|---|
| 8,772,693 B2 | 7/2014 | Popescu et al. | |
| 2011/0149291 A1* | 6/2011 | Yamakita | A61B 5/0066 356/450 |
| 2012/0019883 A1 | 1/2012 | Chae et al. | |
| 2012/0229813 A1* | 9/2012 | Kim | A61B 5/0066 356/479 |
| 2015/0277379 A1 | 10/2015 | Oh | |

OTHER PUBLICATIONS

Christopher J. Mann, et al., "High-resolution quantitative phase-contrast microscopy by digital holography", Optics Express; vol. 13, No. 22, pp. 8693-8698, Oct. 31, 2005.

(Continued)

*Primary Examiner* — Jeffery A Williams
(74) *Attorney, Agent, or Firm* — Kile Park Reed & Houtteman PLLC

(57) ABSTRACT

There are provided an image processing device and a processing method thereof. The image processing method includes obtaining an interference signal using a sample beam and a reference beam, transforming the interference signal by using a numerical signal processing method or an intensity mixing method to generate a transformed interference signal, and obtaining a three-dimensional (3D) phase image by using the interference signal and the transformed interference signal.

11 Claims, 5 Drawing Sheets

(56) References Cited

OTHER PUBLICATIONS

Tomohiro Kiire et al., "Simultaneous formation of four fringes by using a polarization quadrature phase-shifting interferometer with wave plates and a diffraction grating", Applied Optics, vol. 47, No. 26, pp. 4787-4792, Sep. 10, 2008.
Lluís Martinez-León et al., "Single-shot digital holography by use of the fractional Talbot effect", Optics Express, vol. 17, No. 15, pp. 12900-12909, Jul. 20, 2009.
Takahiro Ikeda et al., "Hilbert phase microscopy for investigating fast dynamics in transparent systems", Optics Letters, vol. 30, No. 10, pp. 1165-1167, May 15, 2005.

* cited by examiner

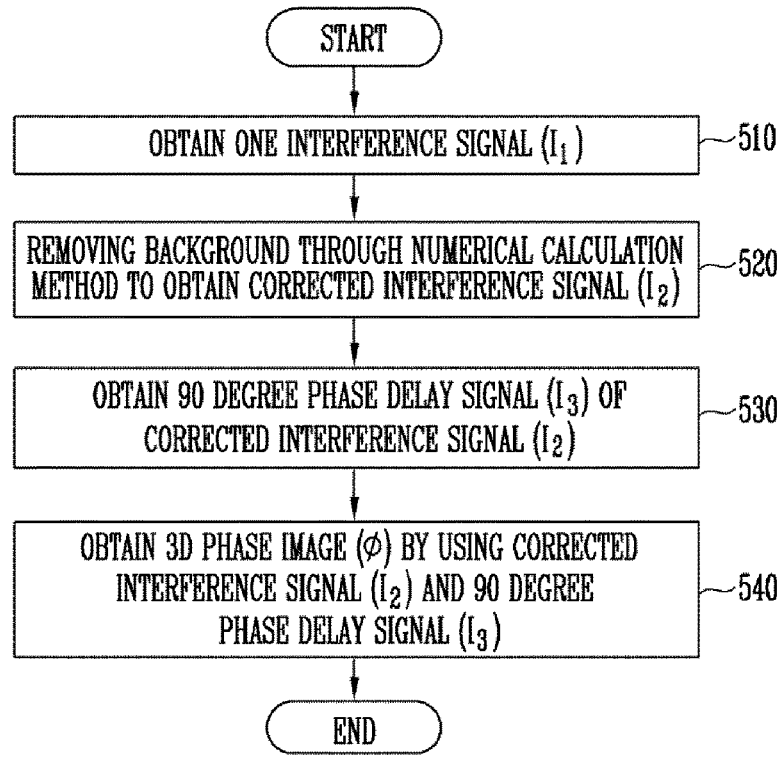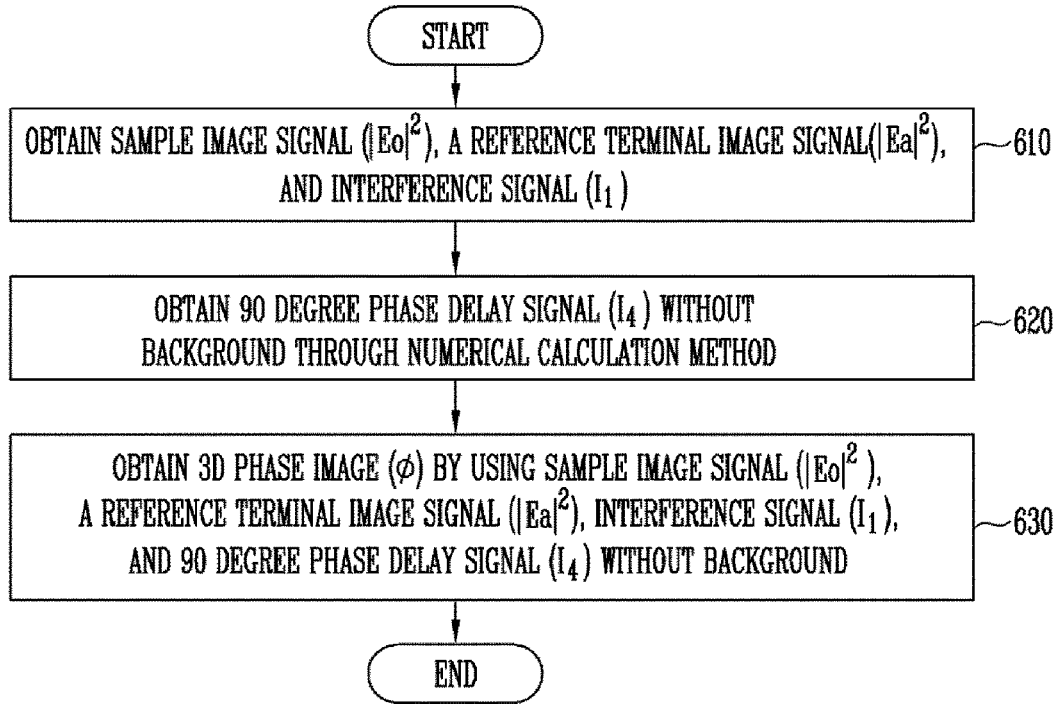

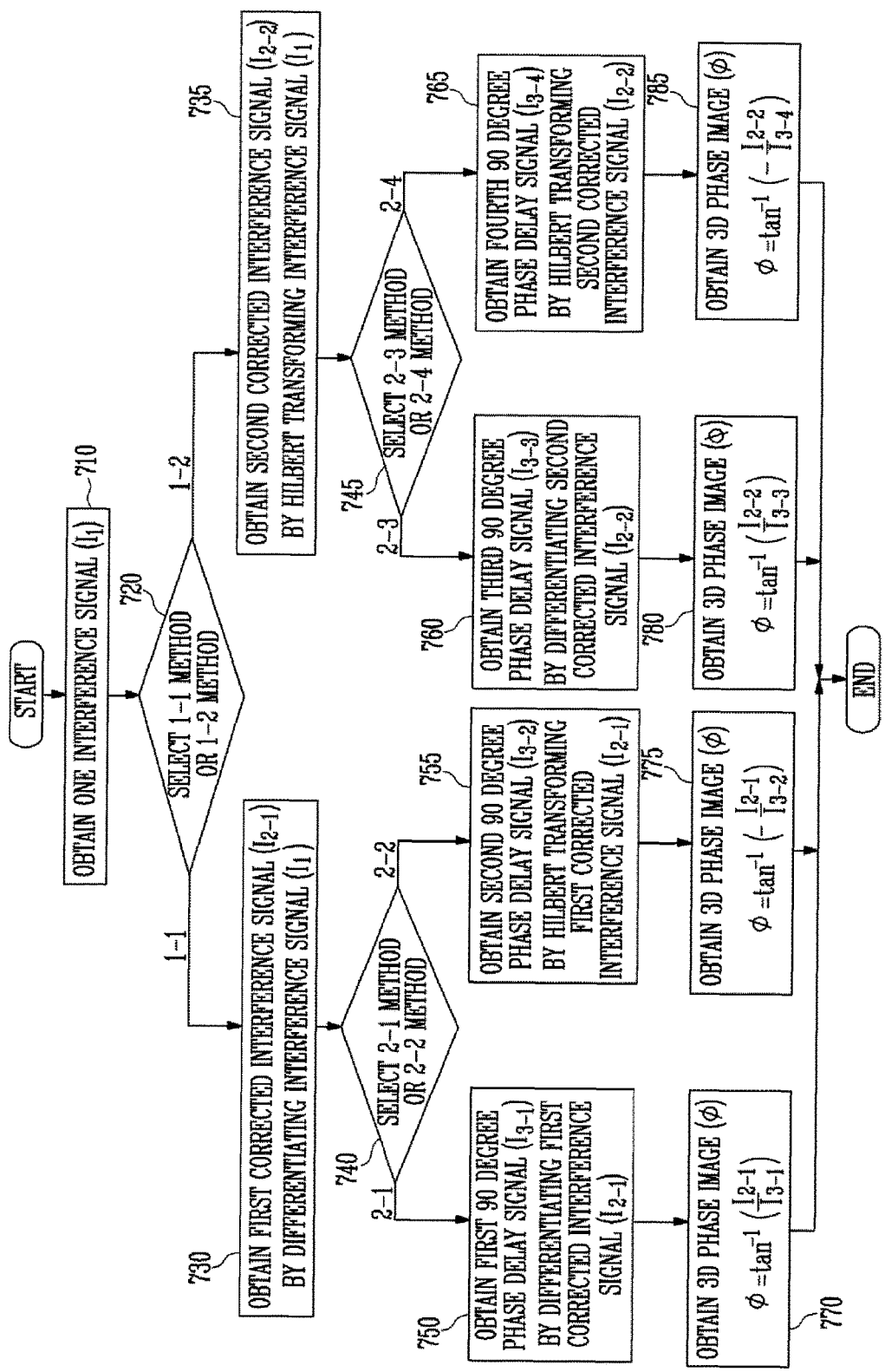

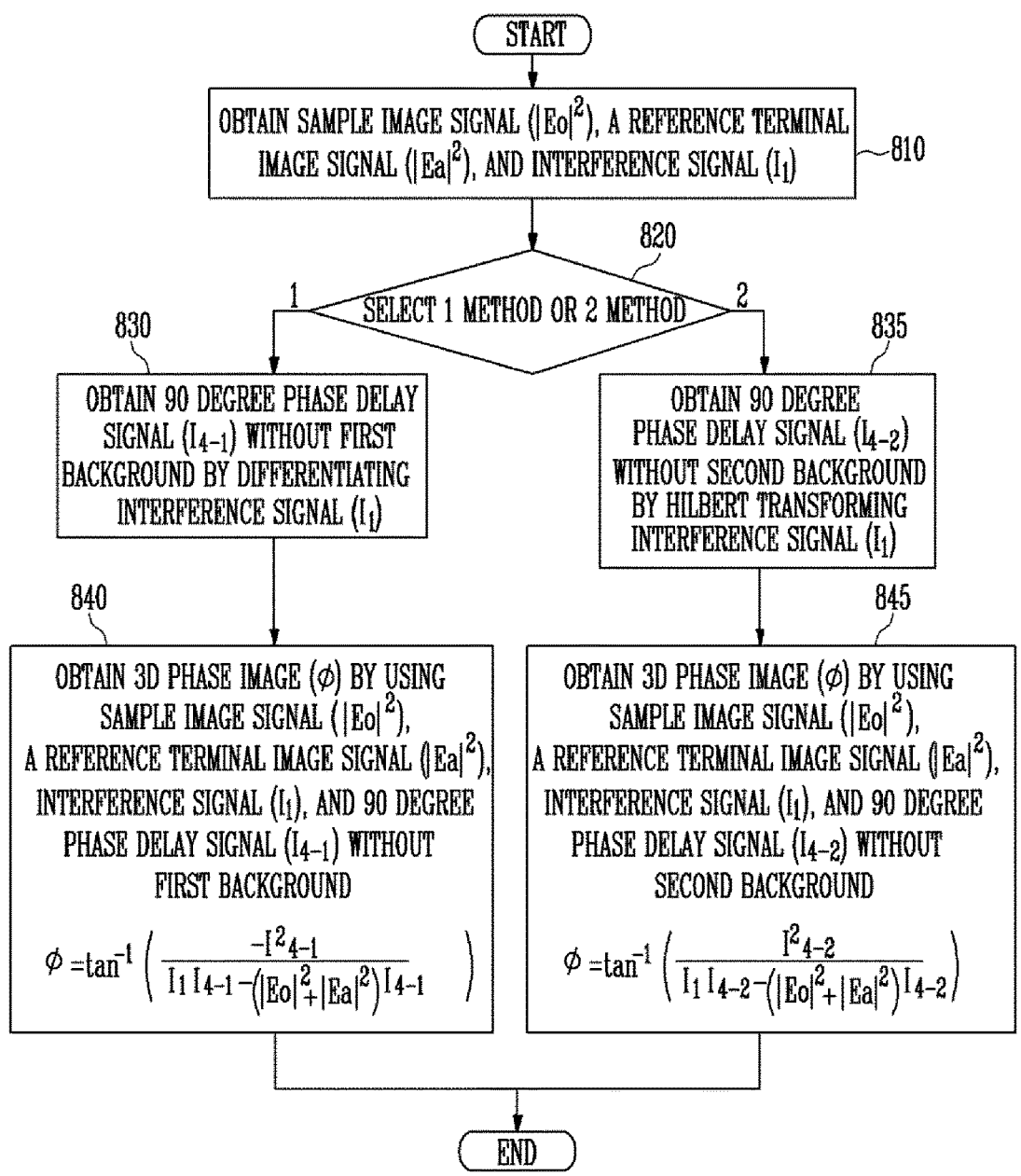

IMAGE PROCESSING DEVICE AND PROCESSING METHOD THEREOF

CROSS-REFERENCE TO RELATED APPLICATION

The present application claims priority to Korean patent application number 10-2016-0018296 filed on Feb. 17, 2016, the entire disclosure of which is incorporated herein in its entirety by reference.

BACKGROUND

1. Field

An embodiment of the present invention relates to an image processing device and a processing method thereof.

2. Description of the Related Art

A method for capturing a three-dimensional (3D) phase image based on holography is rapidly and accurately obtaining 3D information of an object using about two to four interference signals obtained by an interferometer-based system. The method for capturing a 3D phase image based on holography may be applied to a surface roughness and surface shape measurement device, or the like, in a semiconductor industry field and to a 3D image device and a 3D microscope device in a medical diagnosis field and a microorganism field, and as such, the method has so far been developed to be applied to various technologies. However, the method for obtaining a 3D phase image using about two to four interference signals and devices using the same are high in prices, sensitive to vibrations, and may accompany an environment restriction in use for obtaining a 3D phase image of an object.

SUMMARY

An embodiment of the present invention relates to a method for processing an image by using a single interference image and a processing device thereof.

Another embodiment of the present invention relates to an image processing method and a processing device thereof not sensitive to external vibration and thus not restricted to a system usage environment, not use a grating and a polarimeter, and be reduced in size.

Another embodiment of the present invention relates to an image processing method and a processing device thereof, not requiring an interference signal of a high special carrier frequency.

Another embodiment of the present invention relates to an image processing method and a processing device thereof, capable of obtaining pixel information of an image for which it is possible to use a light source without restrictions, that is, it is possible to use an incoherent/coherent light source, and easily aligning an optical system.

Technical subjects of the present invention are not limited to the foregoing technical subjects and any other technical subjects not mentioned will be clearly understood by a skilled person in the art from the following description.

An image processing method according to an embodiment of the present invention includes: obtaining an interference signal using a sample beam and a reference beam; transforming the interference signal by using a numerical signal processing method or an intensity mixing method to generate a transformed interference signal; and obtaining a three-dimensional (3D) phase image by using the interference signal and the transformed interference signal.

The generating of the transformed interference signal may include: removing a background of the interference signal through a numerical calculation method to generate a corrected interference signal; and delaying a phase of the corrected interference signal by 90 degrees to generate a 90 degree phase delay signal, wherein the transformed interference signal includes the corrected interference signal and the 90 degree phase delay signal.

In the generating of the corrected interference signal, the corrected interference signal may be generated by differentiating or Hilbert transforming the interference signal, and in the generating of the 90 degree phase delay signal, the 90 degree phase delay signal may be generated by differentiating or Hilbert transforming the corrected interference signal.

The generating of the transformed interference signal may include removing a background of the interference signal through a numerical calculation method and delaying a phase of the interference signal by 90 degrees to generate a 90 degree phase delay signal without a background, wherein the transformed interference signal includes the 90 degree phase delay signal without a background.

In the generating of the 90 degree phase delay signal without a background, the 90 degree phase delay signal without a background may be generated by differentiating or Hilbert transforming the interference signal.

In the obtaining of the 3D phase image, the 3D phase image may be obtained by using the interference signal, the 90 degree phase delay signal without a background, a sample image signal, and a reference terminal image signal.

An image processing device according to an embodiment of the present invention includes: an interference signal obtaining unit configured to obtain an interference signal by using a sample beam and a reference beam; and a controller configured to transform the interference signal by using a numerical signal processing method or an intensity mixing method to generate a transformed interference signal and obtain a 3D phase image by using the interference signal and the transformed interference signal.

The controller may remove a background of the interference signal through a numerical calculation method to generate a corrected interference signal, and delay a phase of the corrected interference signal by 90 degrees to generate a 90 degree phase delay signal, and the converted interference signal may include the corrected interference signal and the 90 degree phase delay signal.

The controller may generate the corrected interference signal by differentiating or Hilbert transforming the interference signal and generate the 90 degree phase delay signal by differentiating or Hilbert transforming the corrected interference signal.

The controller may generate the 90 degree phase delay signal without a background by removing a background of the interference signal through a numerical calculation method and delaying a phase of the interference signal by 90 degrees, and the converted interference signal may include the 90 degree phase delay signal without a background.

The controller may generate the 90 degree phase delay signal without a background by differentiating or Hilbert transforming the interference signal.

The controller may obtain the 3D phase image by using the interference signal, the 90 degree phase delay signal without a background, a sample image signal, and a reference terminal image signal.

The interference signal obtaining unit may include a Michelson interferometer or a Mach-Zehnder interferometer.

According to an embodiment of the present invention, it is possible to provide a method for processing an image by using a single interference image and a processing device thereof.

Also, in an embodiment of the present invention, it is possible to provide an image processing device which is not restricted in a system usage environment because it is not sensitive to external vibration, does not use a polarimeter, and has a reduced size, and a processing method thereof.

Also, according to an embodiment of the present invention, it is possible to provide an image processing device not requiring an interference signal of a high special carrier frequency and a processing method thereof.

Also, according to an embodiment of the present invention, it is possible to provide an image processing device which is capable of obtaining all of pixel information of an image not restricted in using a light source, that is, used in both incoherent/coherent light source and which easily aligns an optical system, and a processing method thereof.

Also, since the image processing device according to an embodiment of the present invention does not require an additional optical system component for phase shifting, the image processing device is economical, can have a smaller size, is less sensitive to vibration, and thus, is free of environmental image capture restriction conditions. Also, in the case of the numerical signal processing method, it is possible to obtain even 3D information of a moving object. Also, since it is possible to use both incoherent/coherent light sources, it is possible to widen an application field. Also, optical system alignment is easy to become a user-friendly system.

Also, it is possible to apply the image processing device according to an embodiment of the present invention to various fields such as a holographic image capture field or a phase microscope field.

Advantages and effects of the present invention that may be obtained in the present invention are not limited to the foregoing effects and any other technical effects not mentioned herein may be easily understood by a person skilled in the art from the present disclosure and accompanying drawings.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5 is a flow chart illustrating a method for obtaining a 3D phase image according to a numerical signal processing method.

FIG. 6 is a flow chart illustrating a method for obtaining a 3D phase image according to an intensity mixing method.

FIG. 7 is a flow chart illustrating a detailed method for obtaining a 3D phase image according to a numerical signal processing method.

FIG. 8 is a flow chart illustrating a detailed method for obtaining a 3D phase image according to an intensity mixing method.

DETAILED DESCRIPTION

Figure 1:
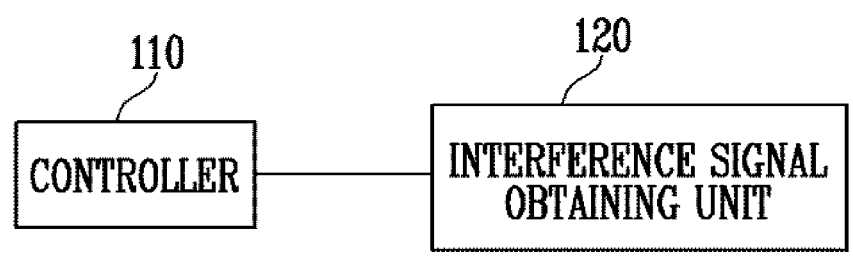
FIG. 1 is a block diagram of an image processing device according to an embodiment of the present invention.

Hereinafter, embodiments of the present invention will be described in detail with reference to the accompanying drawings.

In describing the present invention, if an embodiment has been well known in the art to which the present invention pertains and technical contents is not directly related to an embodiment of the present disclosure, descriptions thereof will be omitted. This is to allow the embodiment of the present invention to be clearly understood without obscuring the gist of the embodiment of the present disclosure.

It is to be understood that when one element is referred to as being "connected to" or "coupled to" another element, it may be connected directly to or coupled directly to another element or be connected to or coupled to another element, having the other element intervening therebetween. In addition, in the following description, and the word 'including' does not preclude the presence of other components and means that an additional component is included in the technical concept of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

Also, elements of the embodiments of the present invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the present invention unless it diverts from the essence of the present invention.

Also, some of the elements may be optional to merely enhance the performance, rather than being essential to perform a constitutional function. The present invention may be implemented by using only the elements requisite for implement the essence of the present invention, excluding elements used to merely enhance the performance, and a structure including only the essential elements excluding the optional elements merely used to enhance the performance is also included in the scope of the present invention.

In describing embodiments of the present invention, a detailed description of known techniques associated with the present invention unnecessarily obscures the gist of the present invention, it is determined that the detailed description thereof will be omitted. Moreover, the terms used henceforth have been defined in consideration of the functions of the present invention, and may be altered according to the intent of a user or operator, or conventional practice. Therefore, the terms should be defined on the basis of the entire content of this specification.

In general, in a method for obtaining a 3D phase image, about two to four phase-shifted interferences are obtained by an image capturing system and undergo a calculation process to obtain one phase image. However, the 3D image obtaining method requires an external environment condition such as vibration isolators or optical tables for removing external vibration while two to four interference images are obtained. Also, in this method, it is impossible to capture an image of a moving object.

An existing holographic image capturing system may be configured on the basis of a Michelson interferometer or a Mach-Zehnder interferometer, but for phase shifting, a piezoelectric transducer and driving equipment are additionally installed to obtain two to four interference images. Thus, the system becomes bulky, complicated, and is difficult to become compact, and external vibration should be blocked when these interference images are obtained. Also, it is difficult to capture an image of an object that moves fast.

On the other hand, methods for obtaining a 3D phase image using a single interference such as an angular spectrum holography method, a polarization method, a grating method, and a Hilbert transforming method have been developed. However, in the case of the angular spectrum holography and Hilbert transforming method, a high special carrier frequency is required, and in the grating and polarization method, a system becomes bulky and alignment of an optical system is intricate. Also, the spectrum holography, the Hilbert conversion method, the grating method and the polarization method are disadvantageous in that half (½) or more of image information is discarded. Also, in the case of the spectrum holography and the Hilbert conversion method, an interference signal should form a spatially high carrier frequency, an intricate system configuration condition is required, and since a coherent light source should be used, there are restrictions in selecting a light source. Such a light source generates speckle noise and increase cost when made to a product.

Thus, the image processing device according to an embodiment of the present invention may use a method for obtaining a 3D phase image by using a single interference image. This will be described in detail hereinafter.

FIG. 1 is a block diagram of an image processing device according to an embodiment of the present invention.

Referring to FIG. 1, the image processing device according to an embodiment of the present invention may include a controller 110 controlling a general operation of the image processing device and an interference signal obtaining unit 120 obtaining an interference signal.

The interference signal obtaining unit 120 may generate a beam and transmit the generated beam to a sample for obtaining a 3D phase image. The beam transmitted to the sample is reflected from the sample to generate an interference signal. The interference signal obtaining unit 120 may obtain the interference signal.

The controller 110 may control the interference signal obtaining unit 120 to obtain one interference signal. Also, the controller 110 may generate a 3D phase image of a sample by using the interference signal obtained from the interference signal obtaining unit 120. At this time, the controller 110 may generate the 3D phase image according to two methods. The first method may be a numerical signal processing method, and the second method may be an intensity mixing method. Details thereof will be described hereinafter.

Figure 2:
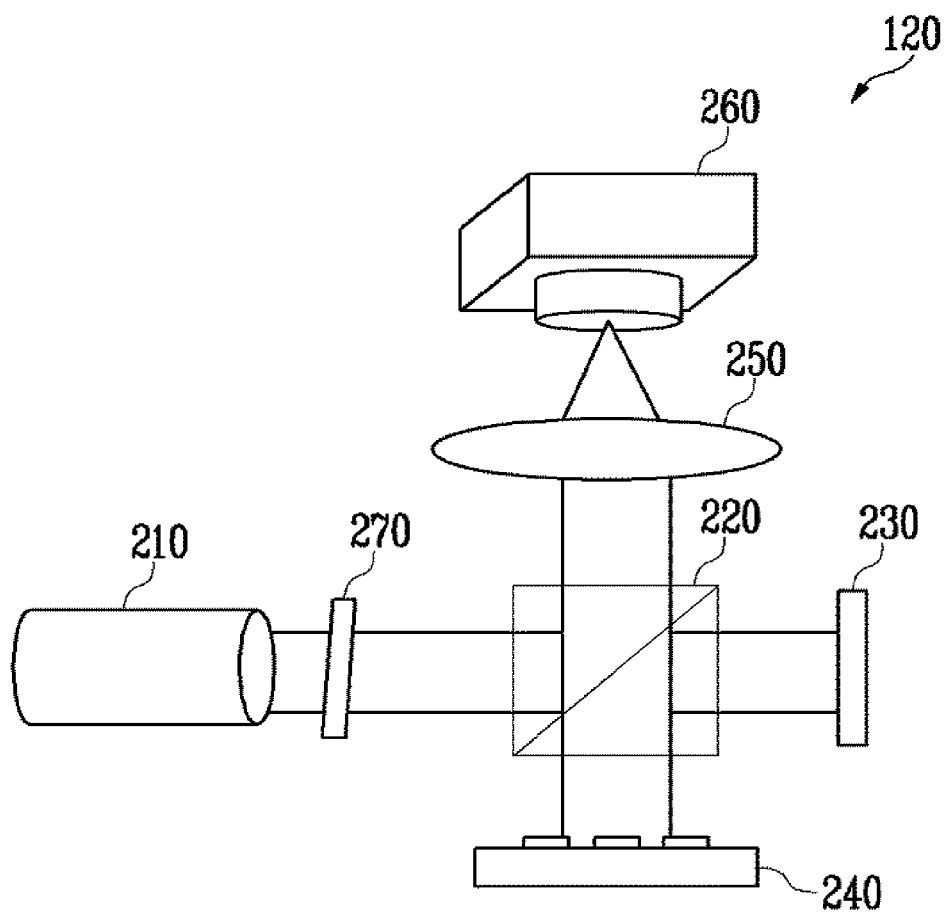
FIG. 2 is a block diagram illustrating a 3D interference signal obtaining unit according to an embodiment of the present invention.

FIG. 2 is a block diagram illustrating a 3D interference signal obtaining unit according to an embodiment of the present invention.

Referring to FIGS. 1 and 2, the interference signal obtaining unit 120 may include a beaming generating unit 210, a beam splitter 220, a mirror 230, a sample mounting unit 240, a lens 250, and a 2D sensor 260. At this time, the interference signal obtaining unit 120 may be a Michelson interferometer-based interference signal obtaining unit. Also, according to an embodiment, the interference signal obtaining unit 120 may further include a neutral density (ND) filter 270.

The beam generating unit 210 may generate and output a beam for obtaining an interference signal. At this time, according to an embodiment, the beam generating unit 210 may include at least one of a super luminescent diode (SLD), a HeNe laser, a laser diode (LD), and a light emitting diode (LED).

Also, a beam generated by the beam generating unit 210 may be input to the beam splitter 220. At this time, according to an embodiment, the ND filter 270 may be positioned between the beam generating unit 210 and the beam splitter 220 and a beam generated by the beam generating unit 210 may pass through the ND filter 270 and then input to the beam splitter 220. The ND filter 270 is a light blocking filter having neutral properties over color and may be a filter adjusting color balance by reducing a transmission amount of light to a degree substantially the same with respect to each wavelength within a specific wavelength range.

The beam splitter 220 may divide an incident beam into a reference beam and a sample beam. The beam splitter 220 may output the reference beam to the mirror 230, and output the sample beam to the sample mounting unit 240.

Thereafter, the reference beam input to the mirror 230 may be reflected from the mirror 230 and input again to the beam splitter 220. The sample beam input to the sample mounting unit 240 may be reflected from the sample mounted on the sample mounting unit 240 and input again to the beam splitter 220. The reference beam and the sample beam input again to the beam splitter 220 may cause interference.

The beam splitter 220 may output an interference beam generated by the reference beam and the sample beam to the 2D sensor 260. At this time, according to an embodiment, the lens 250 may be positioned between the beam splitter 220 and the 2D sensor 260 to adjust focus of the sample image output from the beam splitter 220 and output the interference beam to the 2D sensor 260.

The 2D sensor 260 may obtain an interference signal. At this time, according to an embodiment, the 2D sensor 260 may be a 2D array sensor and may include at least one of a charge coupled device (CCD) and a complementary metal-oxide semiconductor (CMOS).

On the other hand, although not shown, in order to magnify an image of the sample, a lens may be further included between the sample mounting unit 240 and the beam splitter 220. Also, a lens may be further included between the beam splitter 220 and the mirror 230. At this time, the lens may include an object lens according to an embodiment.

The 2D sensor 260 may obtain an interference signal ($I_1$) as expressed by Equation 1 below.

$$I=|E_0|^2+|E_a|^2+2E_0E_a\cos(\phi) \qquad \text{[EQUATION 1]}$$

Here, $E_0$ is a sample beam, $E_a$ is a reference beam, and (I) indicates a 3D phase image of a sample. A detailed method for generating the 3D phase image (T) will be described hereinafter.

Figure 3:
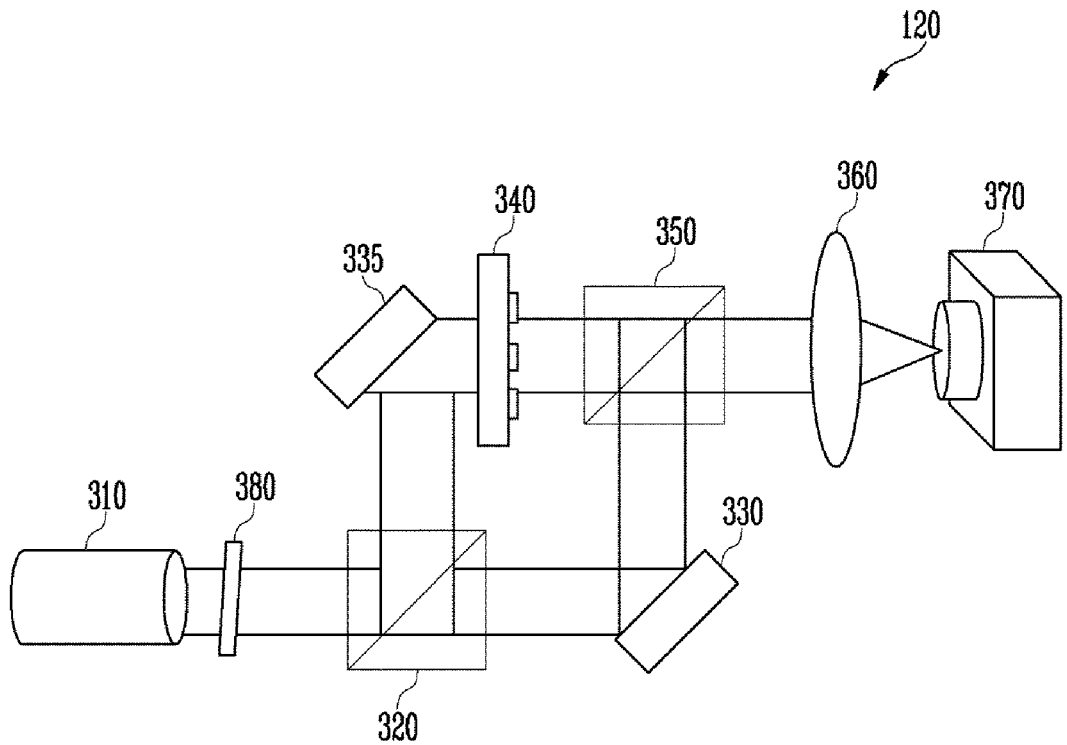
FIG. 3 is a block diagram illustrating a 3D interference signal obtaining unit according to another embodiment of the present invention.

FIG. 3 is a block diagram illustrating a 3D interference signal obtaining unit according to another embodiment of the present invention.

Referring to FIGS. 1 and 3, the interference signal obtaining unit 120 according to another embodiment of the present invention may include a beam generating unit 310, a first beam splitter 320, a first mirror 330, a second mirror 335, a sample mounting unit 340, a second beam splitter 350, a lens 360, and a 2D sensor 370. At this time, the interference signal obtaining unit 120 may be a Mach-Zehnder interferometer-based interference signal obtaining unit. Also, according to an embodiment, the interference signal obtaining unit 120 may further include an ND filter 380.

The beam generating unit 310 may generate and output a beam for obtaining an interference signal. Here, the beam generating unit 310 may include at least one of an SLD, a HeNe laser, an LD, and an LED according to an embodiment.

The beam generated by the beam generating unit 310 may be input to the first beam splitter 320. At this time, according to an embodiment, the ND filter 380 may be positioned between the beam generating unit 310 and the first beam splitter 320 and, after the beam generated by the beam generating unit 310 passes through the ND filter 380, the beam may be input to the first beam splitter 320.

The first beam splitter 320 may divide an incident beam into a reference beam and a sample beam. The beam splitter 320 may output the reference beam to a first mirror 330, and output the sample beam to the sample mounting unit 340. At this time, the sample beam may be input to the second mirror 335, reflected therefrom, and input to the sample mounting unit 340.

Thereafter, the reference beam input to the first mirror 330 may be reflected from the first mirror 330 and input to the second beam splitter 350. The reference beam input to the second beam splitter 350 and the sample beam may meet in the second beam splitter 350 to cause interference.

The second beam splitter 350 may output an interference beam generated by the reference beam and the sample beam to the 2D sensor 370. At this time, according to an embodiment, the lens 360 may be positioned between the second beam splitter 350 and the 2D sensor 370 to adjust focus of the sample image output from the second beam splitter 350 and output the interference beam to the 2D sensor 370.

The 2D sensor 370 may obtain an interference signal by using the interference beam input to the 2D sensor 370. At this time, according to an embodiment, the 2D sensor 370 may be a 2D array sensor and may include at least one of a CCD and a CMOS.

On the other hand, although not shown, in order to magnify an image of the sample, a lens may be further included between the sample mounting unit 340 and the second mirror 335. Also, a lens may be further included between the first beam splitter 320 and the first mirror 330. Also, according to an embodiment, a lens may be further included between the second mirror 335 and the first beam splitter 320, between the second beam splitter 350 and the first mirror 330, and between the sample mounting unit 340 and the second beam splitter 350. At this time, the lens may include an object lens according to an embodiment.

The 2D sensor 370 may obtain an interference signal ($I_1$) as expressed by Equation 1 above.

Figure 4:
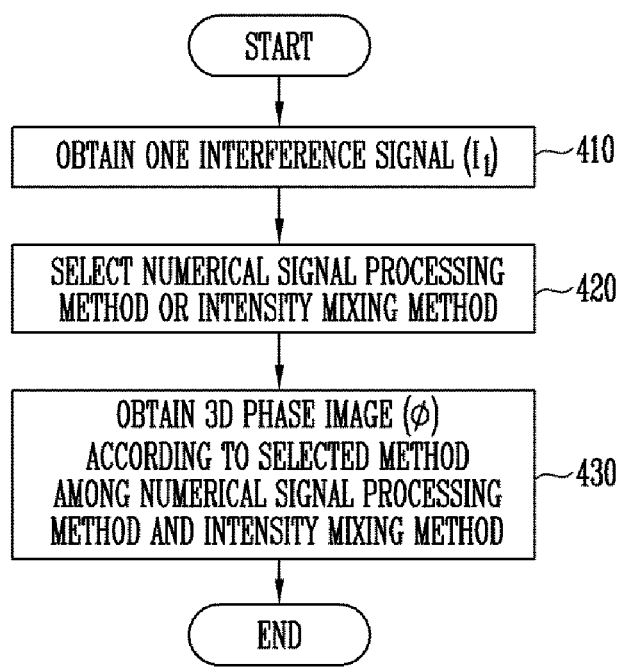
FIG. 4 is a flow chart illustrating a method for generating a 3D phase image according to an embodiment of the present invention.

FIG. 4 is a flow chart illustrating a method for generating a 3D phase image according to an embodiment of the present invention.

Referring to FIG. 4, the image processing device according to an embodiment of the present invention may obtain one interference signal ($I_1$) in step 410. At this time, the interference signal ($I_1$) may be obtained through the interference signal obtaining unit 120 described above in relation to FIGS. 2 and 3.

Thereafter, the image processing device may select at least one of a numerical signal processing method and an intensity mixing method in step 420. At this time, the numerical signal processing method or the intensity mixing method may be selected according to user convenience in consideration of signal processing capability of the image processing device, a surrounding environment, a size of a sample, and resolution of a 3D phase image to be obtained.

Thereafter, in step 430, the image processing device may obtain 3D phase image ($\Phi$) according to the selected method among the numerical signal processing method and the intensity mixing method.

At this time, according to an embodiment, the image processing device may transform the interference signal ($I_1$) by using the selected method among the numerical signal processing method and the intensity mixing method to generate the transformed interference signal. The image processing device may calculate the 3D phase image ($\Phi$) by using the interference signal and the transformed interference signal. The transformed interference signal may include at least one of a corrected interference signal obtained by removing a background of the interference signal, a 90 degree phase delay signal obtained by delaying the corrected interference signal by 90 degrees, and a 90 degree phase delay signal without a background obtained by removing a background of the interference signal and the delaying 90 degree phase.

Hereinafter, a detailed method for obtaining the 3D phase image (T) according to the selected method among the numerical signal processing method and the intensity mixing method will be described.

FIG. 5 is a flow chart illustrating a method for obtaining a 3D phase image according to a numerical signal processing method.

Referring to FIG. 5, the image processing device according to an embodiment of the present invention may obtain one interference signal ($I_1$) in step 510.

In step 520, the image processing device may obtain a corrected interference signal ($I_2$) after removing a background from the interference signal ($I_1$) through a numerical calculation method. For example, the corrected interference signal ($I_2$) may be generated by removing a background of the interference signal ($I_1$) through differentiation or a numerical calculation method such as Hilbert transform.

Thereafter, in step 530, the image processing device may obtain a 90 degree phase delay signal ($I_3$) by using the corrected interference signal ($I_2$). For example, the 90 degree phase delay signal ($I_3$) may be generated by 90 degree phase delaying the corrected interference signal ($I_2$) by using a differentiation or a numerical calculation method such as Hilbert transform.

In step 540, the image processing device may obtain a 3D phase image ($\Phi$) by using the corrected interference signal ($I_2$) obtained in step 520 and the 90 degree phase delay signal ($I_3$) obtained in step 530.

FIG. 6 is a flow chart illustrating a method for obtaining a 3D phase image according to an intensity mixing method.

Referring to FIG. 6, the image processing device according to an embodiment of the present invention may obtain one interference signal ($I_1$) in step 610. Also, the image processing device may obtain a sample image signal ($|E_O|^2$) and a reference terminal image signal ($|E_a|^2$). The sample image signal ($|E_O|^2$) may be generated through a signal input to the 2D sensor 260 or 370 after a sample beam is reflected from a sample or after the sample beam passes through the sample, and the reference terminal image signal ($|E_a|^2$) may be generated through a signal input to the 2D sensor 260 or 370 after a reference beam is reflected from the mirror 230 or 330.

Thereafter, in step 620, the image processing device may remove a background from the interference signal ($I_1$) through a numerical calculation method and simultaneously delay a phase by 90 degree to generate a 90 degree phase delay signal ($I_4$) without a background. At this time, for example, the 90 degree phase delay signal ($I_4$) without a background may be generated by differentiating the interference signal ($I_1$) or by performing Hilbert transform.

In step 630, the image processing device may obtain a 3D phase image ($\Phi$) by using the sample image signal ($|E_O|^2$), the reference terminal image signal ($|E_a|^2$), the interference signal ($I_1$), and the 90 degree phase delay signal ($I_4$) without a background.

FIG. 7 is a flow chart illustrating a detailed method for obtaining a 3D phase image according to a numerical signal processing method.

Referring to FIG. 7, the image processing device according to an embodiment of the present invention may obtain one interference signal ($I_1$) in step 710.

In step 720, the image processing device may select a 1-1 method or a 1-2 method in order to remove a background of the interference signal ($I_1$). The 1-1 method is generating a first corrected interference signal ($I_{2-1}$) by differentiating the interference signal ($I_1$), and the 1-2 method is generating a second corrected interference signal ($I_{2-2}$) by Hilbert-transforming the interference signal ($I_1$). At this time, the 1-1 method or the 1-2 method may be selected according to user convenience in consideration of a signal processing capability of the image processing device, a surrounding environment, a size of a sample, and resolution of a 3D phase image to be obtained.

When the 1-1 method is selected in step 720, the image processing device may generate the first corrected interference signal ($I_{2-1}$) as expressed by Equation 2 below by differentiating the interference signal ($I_1$) expressed by Equation 1.

$$I_{2-1} = -2E_O E_a \sin(\phi) \quad \text{[EQUATION 2]}$$

At this time, $E_O$ is a sample beam, $E_a$ is a reference beam, and $\Phi$ is a 3D phase image of a sample. Also, when Equation 1 and Equation 2 are compared, the first corrected interference signal ($I_{2-1}$) may be a 90 degree phase delayed signal obtained by removing a background signal ($|E_O|^2 + |E_a|^2$) from the interference signal ($I_1$).

On the other hand, when the 1-2 method is selected in step 720, the image processing device may generated the second corrected interference signal ($I_{2-2}$) expressed by Equation 3 by Hilbert-transforming the interference signal ($I_1$) expressed by Equation 1 in step 735.

$$I_{2-2} = 2E_O E_a \sin(\phi) \quad \text{[EQUATION 3]}$$

Also, when Equation 1 and Equation 3 are compared, the second corrected interference signal ($I_{2-2}$) may be a 90 degree phase delayed signal obtained by removing a background signal ($|E_O|^2 + |E_a|^2$) from the interference signal ($I_1$).

After the image processing device obtains the first corrected interference signal ($I_{2-1}$) in step 730, the image processing device may select a 2-1 method or a 2-2 method in order to 90 degree phase delay the first corrected interference signal ($I_{2-1}$) in step 740. The 2-1 method may be generating a first 90 degree phase delay signal ($I_{3-1}$) by differentiating the first corrected interference signal ($I_{2-1}$), and the 2-2 method may be generating a second 90 degree phase delay signal ($I_{3-2}$) by Hilbert transforming the first corrected interference signal ($I_{2-1}$). At this time, the 2-1 method or the 2-2 method may be selected according to user convenience in consideration of a signal processing capability of the image processing device, a surrounding environment, a size of a sample, and resolution of a 3D phase image to be obtained.

When the 2-1 method is selected in step 740, the image processing device may generate a first 90 degree phase delay signal ($I_{3-1}$) expressed by Equation 4 below by differentiating the first corrected interference signal ($I_{2-1}$) expressed by Equation 2 in step 750.

$$I_{3-1} = -2E_O E_a \cos(\phi) \quad \text{[EQUATION 4]}$$

Thereafter, the image processing device may obtain a 3D phase image ($\Phi$) by using the first corrected interference signal ($I_{2-1}$) and the first 90 degree phase delay signal ($I_{3-1}$) in step 770.

Thus, the obtained 3D phase image ($\Phi$) may be expressed by Equation 5 below.

$$\phi = \tan^{-1}\left(\frac{I_{2-1}}{I_{3-1}}\right) \quad \text{[EQUATION 5]}$$

Thus, the 3D phase image ($\Phi$) may be the same as arctangent of a value obtained by dividing the first corrected interference signal ($I_{2-1}$) by the first phase delay signal ($I_{3-1}$).

On the other hand, when the 2-2 method is selected in step 740, the image processing device may generate a second 90 degree phase delay signal ($I_{3-2}$) expressed by Equation 6 below by Hilbert-transforming the first corrected interference signal ($I_{2-1}$) expressed by Equation 2 in step 755.

$$I_{3-2} = 2E_O E_a \cos(\phi) \quad \text{[EQUATION 6]}$$

Thereafter, in step 755, the image processing device may obtain a 3D phase image ($\Phi$) by using the first corrected interference signal ($I_{2-1}$) and the second 90 degree phase delay signal ($I_{3-2}$).

Thus, the obtained 3D phase image ($\Phi$) may be expressed by Equation 7 below.

$$\phi = \tan^{-1}\left(-\frac{I_{2-1}}{I_{3-2}}\right) \quad \text{[EQUATION 7]}$$

Thus, the 3D phase image ($\Phi$) may be the same as arctangent of a value obtained by dividing the first corrected interference signal ($I_{2-1}$) by the second 90 degree phase delay signal ($I_{3-2}$) to obtain a certain value and multiplying $-1$ to the certain value.

After the image processing device obtains the second corrected interference signal ($I_{2-2}$) in step 735, the image processing device may select a 2-3 method or a 2-4 method in order to 90 degree phase delay the second corrected interference signal ($I_{2\text{-}2}$) in step 745. The 2-3 method may be generating a third 90 degree phase delay signal ($I_{3\text{-}3}$) by differentiating the second corrected interference signal ($I_{2\text{-}2}$), and the 2-4 method may be generating a fourth 90 degree phase delay signal ($I_{3\text{-}4}$) by Hilbert transforming the second corrected interference signal ($I_{2\text{-}2}$). At this time, the 2-3 method or the 2-4 method may be selected according to user convenience in consideration of a signal processing capability of the image processing device, a surrounding environment, a size of a sample, and resolution of a 3D phase image to be obtained.

When the 2-3 method is selected in step 745, the image processing device may generate a third 90 degree phase delay signal ($I_{3\text{-}3}$) expressed by Equation 8 by differentiating the second corrected interference signal ($I_{2\text{-}2}$) expressed by Equation 3 in step 760.

$$I_{3\text{-}3} = 2E_O E_a \cos(\phi) \qquad \text{[EQUATION 8]}$$

At this time, referring to Equation 6 and Equation 8, it can be confirmed that both the second 90 degree phase delay signal ($I_{3\text{-}2}$) and the third 90 degree phase delay signal ($I_{3\text{-}3}$) are the same as $2E_0 E_a \cos(\Phi)$.

Thereafter, the image processing device may obtain a 3D phase image ($\Phi$) by using the second corrected interference signal ($I_{2\text{-}2}$) and the third 90 degree phase delay signal ($I_{3\text{-}3}$).

Thus, the obtained 3D phase image ($\Phi$) may be expressed by Equation 9 below.

$$\phi = \tan^{-1}\left(\frac{I_{2\text{-}2}}{I_{3\text{-}3}}\right) \qquad \text{[EQUATION 9]}$$

Thus, the 3D phase image ($\Phi$) may be the same as arctangent of a value obtained by dividing the second corrected interference signal ($I_{2\text{-}2}$) by the third 90 degree phase delay signal ($I_{3\text{-}3}$).

On the other hand, when the 2-3 method is selected in step 745, the image processing device may generate a fourth 90 degree phase delay signal ($I_{3\text{-}4}$) expressed by Equation 10 by Hilbert transforming the second corrected interference signal ($I_{2\text{-}2}$) expressed by Equation 3 in step 765.

$$I_{3\text{-}4} = -2E_O E_a \cos(\phi) \qquad \text{[EQUATION 10]}$$

At this time, referring to Equation 4 and Equation 10, it can be confirmed that both the first 90 degree phase delay signal ($I_{3\text{-}1}$) and the fourth 90 degree phase delay signal ($I_{3\text{-}4}$) are the same as $-2E_0 E_a \cos(\Phi)$.

Thereafter, in step 785, the image processing device may obtain a 3D phase image ($\Phi$) by using the second corrected interference signal ($I_{2\text{-}2}$) and the fourth 90 degree phase delay signal ($I_{3\text{-}4}$).

Thus, the obtained 3D phase image ($\Phi$) may be expressed by Equation 11 below.

$$\phi = \tan^{-1}\left(\frac{I_{2\text{-}2}}{I_{3\text{-}4}}\right) \qquad \text{[EQUATION 11]}$$

Thus, the 3D phase image ($\Phi$) may be the same as arctangent of a value obtained by dividing the second corrected interference signal ($I_{2\text{-}2}$) by the fourth phase delay signal ($I_{3\text{-}4}$) to obtain a certain value and multiplying −1 to the certain value.

As described above, according to the numerical signal processing method, the image processing device according to an embodiment of the present invention may generate the corrected interference signal ($I_2$: $I_{2\text{-}1}$, $I_{2\text{-}2}$) by differentiating or Hilbert transforming one interference signal ($I_1$) and generate the 90 degree phase delay signal ($I_3$: $I_{3\text{-}1}$, $I_{3\text{-}2}$, $I_{3\text{-}3}$, $I_{3\text{-}4}$) by differentiating or Hilbert transforming the corrected interference signal ($I_2$: $I_{2\text{-}1}$, $I_{2\text{-}2}$). Also, the image processing device may obtain the 3D phase image ($\Phi$) by using the corrected interference signal ($I_2$: $I_{2\text{-}1}$, $I_{2\text{-}2}$) and the 90 degree phase delay signal ($I_3$: $I_{3\text{-}1}$, $I_{3\text{-}2}$, $I_{3\text{-}3}$, $I_{3\text{-}4}$).

FIG. 8 is a flow chart illustrating a detailed method for obtaining a 3D phase image according to an intensity mixing method.

Referring to FIG. 8, the image processing device according to an embodiment of the present invention may obtain one interference signal ($I_1$) in step 810. Also, the image processing device may obtain a sample image signal ($|E_0|^2$) and a reference terminal image signal ($|E_a|^2$).

In step 820, the image processing device may select a 1 method or a 2 method in order to remove a background of the interference signal ($I_1$) and simultaneously delay phase by 90 degrees. The 1 method is generating a 90 degree phase delay signal ($I_{4\text{-}1}$) without a first background by differentiating the interference signal ($I_1$), and the 2 method is generating a 90 degree phase delay signal ($I_{4\text{-}2}$) without a second background by Hilbert transforming the interference signal ($I_1$). At this time, the 1 method or the 2 method may be selected according to user convenience in consideration of a signal processing capability of the image processing device, a surrounding environment, a size of a sample, and resolution of a 3D phase image to be obtained.

When the 1 method is selected in step 820, the image processing device may obtain a 90 degree phase delay signal ($I_{4\text{-}1}$) without a first background by differentiating the interference signal ($I_1$) expressed by Equation 1 in step 830.

At this time, for the convenience of explanation, Equation 1 may be expressed by Equation 12 below.

$$I_1 = A + B\cos(\phi), A = |E_0|^2 \pm |E_a|^2, B = 2E_0 E_a \qquad \text{[EQUATION 12]}$$

The 90 degree phase delay signal ($I_{4\text{-}1}$) without a first background may be generated as expressed by Equation 13 below.

$$I_{4\text{-}1} = -B\sin(\phi) \qquad \text{[EQUATION 13]}$$

In step 840, the image processing device may obtain a 3D phase image ($\Phi$) by using the sample image signal ($|E_0|^2$), the reference terminal image signal ($|E_a|^2$), the interference signal ($I_1$), and the 90 degree phase delay signal ($I_{4\text{-}1}$) without a first background.

In detail, $\tan(\Phi)$ may be calculated as expressed by Equation 14 below by using the interference signal ($I_1$) and the 90 degree phase delay signal ($I_{4\text{-}1}$) without a first background.

$$\tan(\phi) = \frac{-I_{4\text{-}1}^2}{I_1 I_{4=1} - A I_{4\text{-}1}} = \frac{B^2 \sin^2(\phi)}{B^2 \sin(\phi)\cos(\phi)} \qquad \text{[EQUATION 14]}$$

Thus, the obtained 3D phase image ($\Phi$) may be expressed by Equation 15 below.

$$\phi = \tan^{-1}\left(\frac{-I_{4\text{-}1}^2}{I_1 I_{4\text{-}1} - A I_{4\text{-}1}}\right) = \qquad \text{[EQUATION 15]}$$

-continued $$\tan^{-1}\left(\frac{-I_{4-1}^2}{I_1 I_{4-1}(|E_0|^2+|E_a|^2)I_{4-1}}\right)$$

On the other hand, when the 2 method is selected in step 820, the image processing device may obtain a 90 degree phase delay signal ($I_{4-2}$) without a second background as expressed by Equation 16 by Hilbert transforming the interference signal ($I_1$) expressed by Equation 12 in step 835.

$$I_{4-2}=B\sin(\phi) \quad \text{[EQUATION 16]}$$

In step 845, the image processing device may obtain a 3D phase image ($\Phi$) by using the sample image ($|E_a|^2$), the reference terminal image signal ($|E_a|^2$), the interference signal ($I_1$), and the 90 degree phase delay signal ($I_{4-2}$) without a second background In detail, $\tan(\phi)$ may be calculated as expressed by Equation 17 below by using the interference signal ($I_1$) and the 90 degree phase delay signal ($I_{4-2}$) without a second background.

$$\tan(\phi)=\frac{-I_{4-2}^2}{I_1 I_{4=2}-AI_{4-2}}=\frac{B^2\sin^2(\phi)}{B^2\sin(\phi)\cos(\phi)} \quad \text{[EQUATION 17]}$$

Thus, the obtained 3D phase image ($\Phi$) may be expressed by Equation 18 below.

$$\phi=\tan^{-1}\left(\frac{-I_{4-2}^2}{I_1 I_{4-2}-AI_{4-2}}\right)= \quad \text{[EQUATION 18]}$$

$$\tan^{-1}\left(\frac{-I_{4-2}^2}{I_1 I_{4-1}(|E_0|^2+|E_a|^2)I_{4-2}}\right)$$

As described above, according to the intensity mixing method, the image processing device according to an embodiment of the present invention may generate the 90 degree phase delay signal ($I_4$: $I_{4-1}$, $I_{4-2}$) without a background by differentiating or Hilbert transforming one interference signal ($I_1$). Also, the image processing device may obtain the 3D phase image ($\Phi$) by using the sample image signal ($|E_0|^2$), the reference terminal image signal ($|E_a|^2$), the interference signal ($I_1$), and the 90 degree phase delay signal ($I_4$: $I_{4-1}$, $I_{4-2}$) without a background.

Embodiments of the present invention described in detail hereinabove are proposed for the purpose of describing particular embodiments only and not intended to be limiting of the invention. In addition to the embodiments of the present invention illustrated and described herein, it would be obvious to those skilled in the art that various other changes and modifications can be made without departing from the spirit and scope of the invention.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. An image processing method comprising:
    obtaining a single interference signal using a sample beam and a reference beam;
    transforming the single interference signal by using a numerical signal processing method or an intensity mixing method to generate a transformed interference signal; and
    obtaining a three-dimensional (3D) phase image by using the single interference signal and the transformed interference signal,
    wherein the generating of the transformed interference signal comprises:
    removing a background of the single interference signal through a numerical calculation method to generate a corrected interference signal; and
    delaying, a phase of the corrected interference signal by 90 degrees to generate a 90 degree phase delay signal,
    wherein the transformed interference si final includes the corrected interference signal and the 90 degree phase delay signal.

2. The image processing method of claim 1,
    wherein, in the generating of the corrected interference signal, the corrected interference signal is generated by differentiating or Hilbert transforming the single interference signal, and
    wherein, in the generating of the 90 degree phase delay signal, the 90 degree phase delay signal is generated by differentiating or Hilbert transforming the corrected interference signal.

3. The image processing method of claim 1,
    wherein the generating of the transformed interference signal includes removing a background of the single interference signal through a numerical calculation method and delaying a phase of the single interference signal by 90 degrees to generate a 90 degree phase delay signal without a background,
    wherein the transformed interference signal includes the 90 degree phase delay signal without a background.

4. The image processing method of claim 3, wherein, in the generating of the 90 degree phase delay signal without a background, the 90 degree phase delay signal without a background is generated by differentiating or Hilbert transforming the single interference signal.

5. The image processing method of claim 3, wherein, in the obtaining of the 3D phase image, the 3D phase image is obtained by using the single interference signal, the 90 degree phase delay signal without a background, a sample image signal, and a reference terminal image signal.

6. An image processing device comprising:
    an interference signal obtaining unit configured to obtain a single interference signal by using a sample beam and a reference beam; and
    a controller configured to transform the single interference signal by using a numerical signal processing method or an intensity mixing method to generate a transformed interference signal and obtain a 3D phase image by using the single interference signal and the transformed interference signal,
    wherein the interference signal obtaining unit includes an interferometer,
    wherein the controller removes a background of the single interference signal through a numerical calculation method to generate a corrected interference signal, and delay a phase of the corrected interference signal by 90 degrees to generate a 90 degree phase delay signal, and
    wherein the transformed interference signal includes the corrected interference signal and the 90 degree phase delay signal.

7. The image processing device of claim 6, wherein controller generates the corrected interference signal by differentiating or Hilbert transforming the single interference signal and generate the 90 degree phase delay signal by differentiating or Hilbert transforming the corrected interference signal.

8. The image processing device of claim 6,
wherein the controller generates the 90 degree phase delay signal without a background by removing a background of the single interference signal through a numerical calculation method and delaying a phase of the single interference signal by 90 degrees, and
wherein the transformed interference signal includes the 90 degree phase delay signal without a background.

9. The image processing device of claim 8, wherein the controller generates the 90 degree phase delay signal without a background by differentiating or Hilbert transforming the single interference signal.

10. The processing device of claim 8, wherein the controller obtains the 3D phase image by using the single interference signal, the 90 degree phase delay signal without a background, a sample image signal, and a reference terminal image signal.

11. The processing device of claim 6, wherein the interference signal obtaining unit includes a Michelson interferometer or a Mach-Zehnder interferometer.

* * * * *